United States Patent
Nagai et al.

(10) Patent No.: US 10,638,014 B2
(45) Date of Patent: Apr. 28, 2020

(54) INFORMATION OUTPUT SYSTEM AND INFORMATION OUTPUT METHOD

(71) Applicants: Tasuku Nagai, Kanagawa (JP); Norio Sakai, Kanagawa (JP)

(72) Inventors: Tasuku Nagai, Kanagawa (JP); Norio Sakai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/292,445

(22) Filed: Mar. 5, 2019

(65) Prior Publication Data
US 2019/0306368 A1    Oct. 3, 2019

(30) Foreign Application Priority Data

Mar. 29, 2018   (JP) ................. 2018-065033

(51) Int. Cl.
  *H04N 1/00*    (2006.01)
  *H04N 1/32*    (2006.01)

(52) U.S. Cl.
  CPC ..... *H04N 1/32587* (2013.01); *H04N 1/00962* (2013.01); *H04N 1/32673* (2013.01)

(58) Field of Classification Search
  CPC ........... H04N 1/32673; H04N 1/32587; H04N 1/00962
  USPC ...................................................... 358/1.15
  See application file for complete search history.

(56) References Cited

U.S. PATENT DOCUMENTS

2012/0170068 A1*  7/2012  Ikeda ............... G06K 15/02
                                                          358/1.13
2014/0347692 A1*  11/2014  Iida ................. G06F 3/1273
                                                          358/1.15

FOREIGN PATENT DOCUMENTS

JP         2008-078725         4/2008

* cited by examiner

*Primary Examiner* — Saeid Ebrahimi Dehkordy
(74) *Attorney, Agent, or Firm* — Harness, Dickey & Pierce, P.L.C.

(57) ABSTRACT

An information output system includes a main memory, a first processing circuit, a second processing circuit, an output device, and notifying circuitry. The main memory is configured to store information. The first processing circuit is configured to read the information from the main memory. The second processing circuit is configured to transfer the information read. The output device is configured to output the information transferred. The notifying circuitry is configured to notify the second processing circuit of an activation timing of the first processing circuit. The second processing circuit is configured to start to transfer the information after being notified of the activation timing of the first processing circuit or request the first processing circuit to cancel reading of the information, according to a time by which the activation timing notified is delayed from an activation timing of the second processing circuit.

10 Claims, 6 Drawing Sheets

INFORMATION OUTPUT SYSTEM AND INFORMATION OUTPUT METHOD

CROSS-REFERENCE TO RELATED APPLICATIONS

This patent application is based on and claims priority pursuant to 35 U.S.C. § 119(a) to Japanese Patent Application No. 2018-065033, filed on Mar. 29, 2018, in the Japan Patent Office, the entire disclosure of which is hereby incorporated by reference herein.

BACKGROUND

Technical Field

Embodiments of the present disclosure relate to an information output system and an information output method.

Related Art

An image forming apparatus, which is one of apparatuses that output information, often reads data from a hard disk drive (HDD) to a memory, processes the read data, and then transfers the processed data to a plotter.

SUMMARY

In one embodiment of the present disclosure, a novel information output system includes a main memory, a first processing circuit, a second processing circuit, an output device, and notifying circuitry. The main memory is configured to store information. The first processing circuit is configured to read the information from the main memory. The second processing circuit is configured to transfer the information read. The output device is configured to output the information transferred. The notifying circuitry is configured to notify the second processing circuit of an activation timing of the first processing circuit. The second processing circuit is configured to start to transfer the information after being notified of the activation timing of the first processing circuit or request the first processing circuit to cancel reading of the information, according to a time by which the activation timing notified is delayed from an activation timing of the second processing circuit.

Also described is a novel information processing method.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
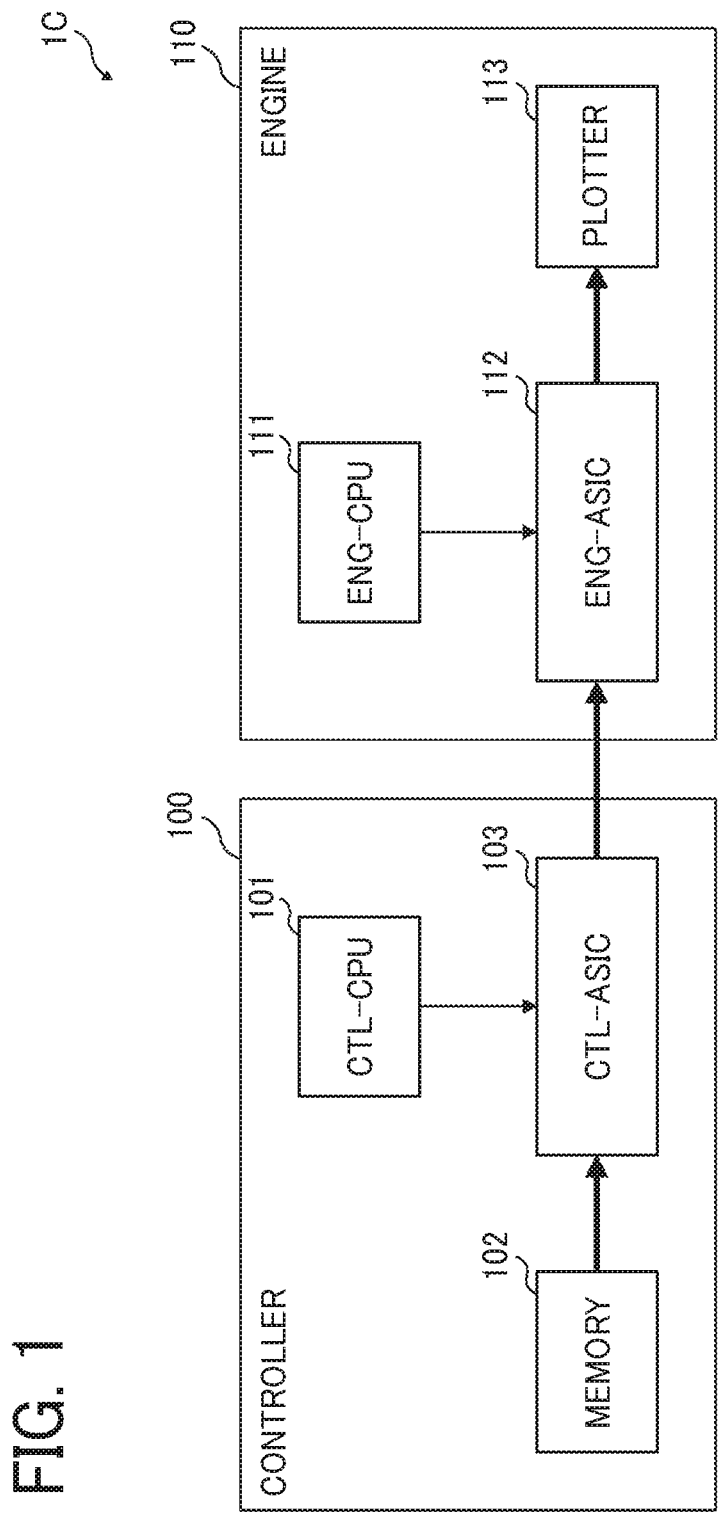
FIG. 1 is a diagram illustrating a configuration of a comparative image forming apparatus as a comparative information output system.

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

Referring to the drawings, wherein like reference numerals designate identical or corresponding parts throughout the several views, embodiments of the present disclosure are described below.

Before describing an information output system according to an embodiment of the present disclosure, a description is now given of a configuration of a comparative image forming apparatus as a comparative information output system.

FIG. 1 is a diagram illustrating a configuration of a comparative image forming apparatus 1C as a comparative information output system.

The comparative image forming apparatus 1C includes a controller 100 and an engine 110 as modules.

The controller 100 executes various types of processing, such as controlling the comparative image forming apparatus 1C, receiving a print instruction, and reading, from a memory 102, image data to be printed.

The engine 110 acquires the image data from the controller 100 and prints out an image according to the image data.

The above-mentioned modules may be mounted in one apparatus or may be separately mounted on two or more apparatuses.

In order to execute the processing described above, the controller 100 includes a central processing unit (CPU), herein referred to as a CTL-CPU 101, the memory 102, and an application specific integrated circuit (ASIC), herein referred to as a CTL-ASIC 103. The CTL-CPU 101 controls the comparative image forming apparatus 1C. The memory 102 stores image data. The CTL-ASIC 103 reads the image data from the memory 102.

The CTL-CPU 101 receives a print instruction and outputs a run command to the CTL-ASIC 103.

The run command from the CTL-CPU 101 activates the CTL-ASIC 103, causing the CTL-ASIC 103 to read image data from the memory 102.

The CTL-ASIC 103 includes an internal buffer that temporarily stores data. The CTL-ASIC 103 stores, in the internal buffer, the image data thus read.

Then, the CTL-ASIC 103 enters a standby mode.

The engine 110 includes an ENG-CPU 111, an ENG-ASIC 112, and a plotter 113. The ENG-CPU 111 controls the engine 110. The ENG-ASIC 112 acquires image data from the controller 100 and executes image processing. The plotter 113 prints out an image according to the image data output from the ENG-ASIC 112.

The ENG-CPU 111 executes software for controlling printing and outputs a start command to the ENG-ASIC 112 to cause the ENG-ASIC 112 to acquire the image data from the controller 100.

The start command from the ENG-CPU 111 activates the ENG-ASIC 112, causing the ENG-ASIC 112 to read and acquire the image data from the internal buffer of the CTL-ASIC 103 of the controller 100.

Like the CTL-ASIC 103, the ENG-ASIC 112 includes an internal buffer that temporarily stores data. The ENG-ASIC 112 stores, in the internal buffer, the image data thus acquired.

Then, the ENG-ASIC 112 enters a standby mode.

The ENG-ASIC 112 retains, as an ENG-ASIC delay amount, information on the time from the receipt of the start command to the output of data to the plotter 113.

At the time when the ENG-ASIC delay amount elapses from the receipt of the start command, the ENG-ASIC 112 starts to output the image data from the internal buffer to the plotter 113.

The plotter 113 prints out an image according to the image data thus output from the ENG-ASIC 112.

Thereafter, the process repeats in which the CTL-ASIC 103 reads image data from the memory 102, the ENG-ASIC 112 acquires the image data from the CTL-ASIC 103, and the ENG-ASIC 112 outputs the image data to the plotter 113.

Thus, the ENG-ASIC 112 is capable of outputting data for one or more pages.

In the configuration of the comparative image forming apparatus 1C, activation of the CTL-ASIC 103 precedes activation of the ENG-ASIC 112 to obtain a reliable printing result.

However, when a software error causes activation of the CTL-ASIC 103 and the ENG-ASIC 112 in an erroneous order, the ENG-ASIC 112 starts to read from the CTL-ASIC 103 even though the CTL-ASIC 103 does not store image data in the internal buffer. As a result, incorrect data is output from the ENG-ASIC 112 and a defective image might be printed out.

In order to prevent such a defective image from being printed out even when a software malfunction occurs, the present embodiment provides a storing unit to which information is writable from a CPU of a controller (i.e., CTL-CPU).

A separate memory may be provided as the storing unit. One embodiment of the present disclosure provides, as the storing unit, a register that is a memory circuit in an ASIC of an engine (i.e., ENG-ASIC).

Figure 2:
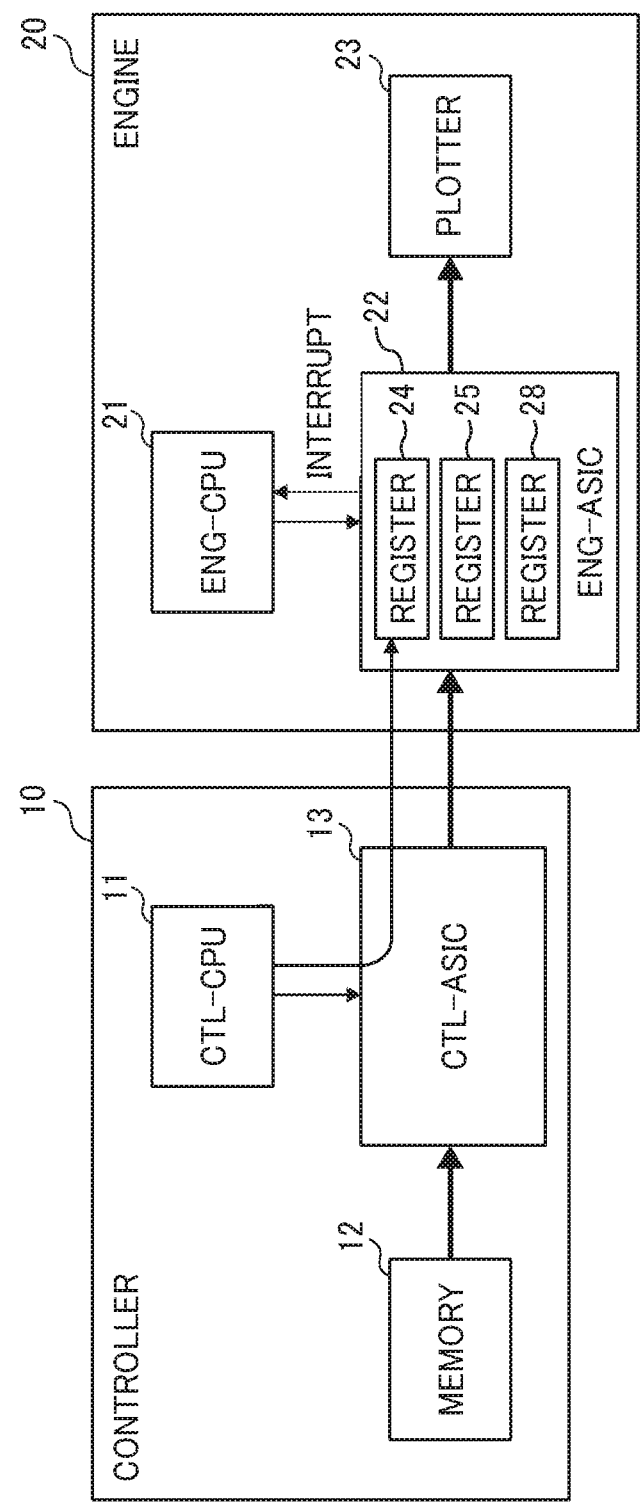
FIG. 2 is a diagram illustrating a first configuration of an image forming apparatus as an information output system according to an embodiment of the present disclosure.

Referring now to FIG. 2, a description is given of a first configuration of an image forming apparatus as an information output system according to an embodiment of the present disclosure.

FIG. 2 is a diagram illustrating a configuration of an image forming apparatus 1a, as the first configuration of the image forming apparatus as an information output system according to an embodiment of the present disclosure.

Like the comparative image forming apparatus 1C, the image forming apparatus 1a of the present embodiment includes a controller 10 and an engine 20 serving as a first module and a second module, respectively.

The controller 10 includes a CTL-CPU 11, a memory 12, and a CTL-ASIC 13.

The engine 20 includes an ENG-CPU 21, an ENG-ASIC 22, and a plotter 23.

The memory 12 serves as a storing unit or a main memory that stores image data as information to be output.

The CTL-ASIC 13 serves as a first processing unit or circuit that reads the image data from the memory 12.

The ENG-ASIC 22 serves as a second processing unit or circuit that transfers the image data from the CTL-ASIC 13 to the plotter 23.

The plotter 23 serves as an output unit or an output device that outputs the image data transferred.

In the present embodiment, the CTL-CPU 11 serves as a notifying unit that notifies the ENG-ASIC 22 of an activation timing of the CTL-ASIC 13. The ENG-ASIC 22 includes a register 24 that serves as a storing unit to store the activation timing notified. The ENG-ASIC 22 refers to the activation timing stored in the register 24.

After issuing a run command to the CTL-ASIC 13, the CTL-CPU 11 issues a Memory Ready command for notifying the ENG-ASIC 22 of the activation timing of the CTL-ASIC 13.

The Memory Ready command is written into the register 24 via the CTL-ASIC 13.

The date and time at which the Memory Ready command is written are also stored in the register 24 in association with the Memory Ready command.

A start command from the ENG-CPU 21 serving as a control unit activates the ENG-ASIC 22, which confirms the data and time at which the ENG-ASIC 22 receives the start command and the date and time at which the Memory Ready command is written into the register 24.

In a case in which the date and time at which the Memory Ready command is written into the register 24 is earlier than the data and time at which the ENG-ASIC 22 receives the start command, the CTL-ASIC 13 reads image data from the memory 12 and the ENG-ASIC 22 activated after activation of the CTL-ASIC 13 transfers the image data to the plotter 23. As a result, the plotter 23 prints out a reliable image.

By contrast, in a case in which the date and time at which the Memory Ready command is written into the register 24 is later than the data and time at which the ENG-ASIC 22 receives the start command, the activation order is exchanged between the CTL-ASIC 13 and the ENG-ASIC 22. To prevent a defective image from being printed out, the ENG-ASIC 22 performs the following process.

According to a time (hereinafter referred to as a delay time) by which the writing of the Memory Ready command into the register 24 is delayed from the receipt of the start command, the ENG-ASIC 22 starts to transfer the image data after the Memory Ready command is written into the register 24 or requests cancellation of reading of the image data.

In other words, the ENG-ASIC 22 requests cancellation of printing of a corresponding page.

In addition to the ENG-ASIC delay amount, the ENG-ASIC 22 retains, in a register 28, an allowable delay time (or allowable delay amount), which is less than the ENG-ASIC delay amount, to determine which process is to be executed. Thus, the register 28 serves as a storing unit that stores the allowable delay time (or allowable delay amount) herein serving as a first delay time.

The allowable delay amount is set as a waiting limit for enabling the ENG-ASIC 22 to start to output data to the plotter 23 according to the ENG-ASIC delay amount.

The ENG-ASIC 22 compares the delay time described above with the allowable delay amount.

In a case in which the delay time is less than the allowable delay amount, the ENG-ASIC 22 starts to transfer the image data after the Memory Ready command is written into the register 24.

By contrast, in a case in which the delay time is greater than the allowable delay amount, the ENG-ASIC 22 requests the CTL-ASIC 13 to cancel printing.

Specifically, the delay time less than the allowable delay amount allows the ENG-ASIC 22 to acquire the image data by the time when the ENG-ASIC delay amount elapses. Therefore, the ENG-ASIC 22 starts to transfer the image data after the Memory Ready command is written into the register 24.

Thus, the printing is continued.

By contrast, the delay time greater than the allowable delay amount does not allow the ENG-ASIC 22 to acquire the image data by the time when the ENG-ASIC delay amount elapses. Continuation of the printing merely generates a defective image.

To prevent such a situation, the ENG-ASIC 22 requests the CTL-ASIC 13 to cancel the printing of the corresponding page.

Specifically, the ENG-ASIC 22 issues, to the ENG-CPU 21, an interrupt requesting cancellation of data reading (i.e., cancellation of printing).

The ENG-CPU 21 notifies the CTL-CPU 11 of the cancellation via the CTL-ASIC 13.

The CTL-CPU 11 instructs the CTL-ASIC 13 to cancel the reading of the image data.

After canceling the reading and printing, the CTL-CPU 11 issues another run command to restart the printing sequence from the beginning.

The ENG-ASIC 22 is capable of detecting an activation timing error between the CTL-ASIC 13 and the ENG-ASIC 22. Specifically, the ENG-ASIC 22 is capable of detecting that the ENG-ASIC 22 is activated before the CTL-ASIC 13 is activated.

The image forming apparatus 1a includes a register 25 as a storing unit that stores information indicating occurrence of the activation timing error.

An error flag is used as the information indicating occurrence of the activation timing error, for example.

The ENG-CPU 21 recognizes the occurrence of the activation timing error with reference to the error flag.

Figure 3:
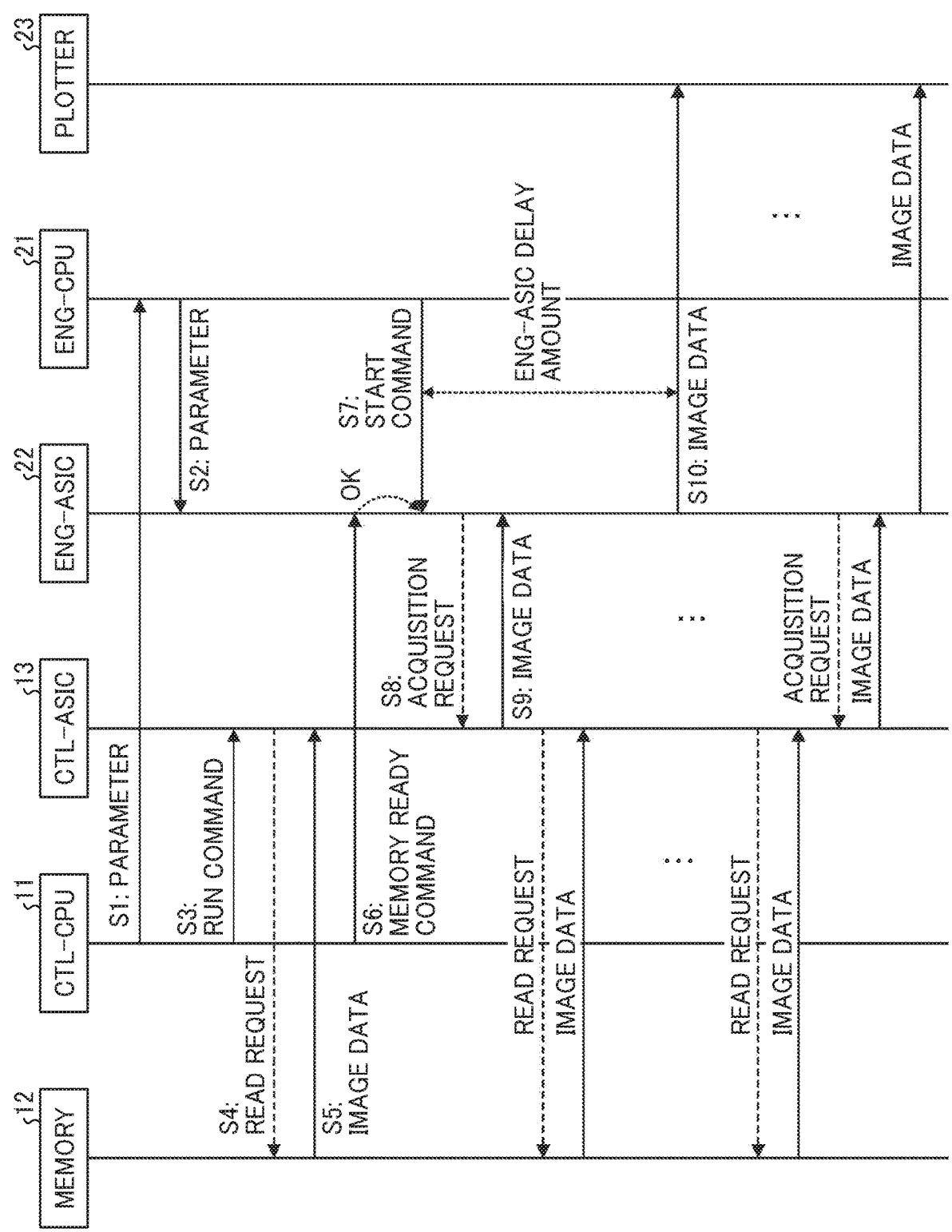
FIG. 3 is a sequence diagram of a printing process in a normal state of the image forming apparatus.

Referring now to FIG. 3, a description is given of a normal printing process.

FIG. 3 is a sequence diagram of a printing process in a normal state of the image forming apparatus 1a.

In the normal printing process, the ENG-ASIC 22 receives the start command from the ENG-CPU 21 after the Memory Ready command is written into the register 24 of the ENG-ASIC 22.

In step S1, in response to a printing request from, e.g., a user, the CTL-CPU 11 stores, in the memory 12, image data subjected to printing and transmits various parameters, such as print configurations set by the user, to the ENG-CPU 21.

In step S2, the ENG-CPU 21 transmits, to the ENG-ASIC 22, the parameters thus received.

The ENG-ASIC 22 uses the parameters thus received to process the image data.

In step S3, the CTL-CPU 11 issues a run command to the CTL-ASIC 13.

The run command activates the CTL-ASIC 13.

In step S4, the CTL-ASIC 13 requests the image data from the memory 12.

In step S5, the CTL-ASIC 13 reads the image data from the memory 12.

The image data thus read is stored in an internal buffer of the CTL-ASIC 13.

In step S6, the CTL-CPU 11 issues a Memory Ready command to the ENG-ASIC 22 via the CTL-ASIC 13 and writes the Ready command into the register 24.

In step S7, the ENG-CPU 21 issues a start command to the ENG-ASIC 22.

The start command activates the ENG-ASIC 22, which refers to the register 24.

In the present example, the activation of the CTL-ASIC 13 precedes the activation of the ENG-ASIC 22. Therefore, the ENG-ASIC 22 determines that no error occurs in the activation timing.

In step S8, the ENG-ASIC 22 requests the image data from the CTL-ASIC 13.

In step S9, the ENG-ASIC 22 acquires the image data from the internal buffer of the CTL-ASIC 13.

The CTL-ASIC 13 repeats requesting and reading image data from the memory 12.

Similarly, the ENG-ASIC 22 repeats requesting the image data from the CTL-ASIC 13 and acquiring the image data from the internal buffer of the CTL-ASIC 13.

These processes are repeated until the CTL-ASIC 13 reads all the image data from the memory 12.

In step S10, when the ENG-ASIC delay amount retained by the ENG-ASIC 22 elapses, the ENG-ASIC 22 transfers, to the plotter 23, the image data thus acquired, causing the plotter 23 to print out an image according to the image data.

This process is also repeated until the ENG-ASIC 22 transfers all the image data acquired.

Figure 4:
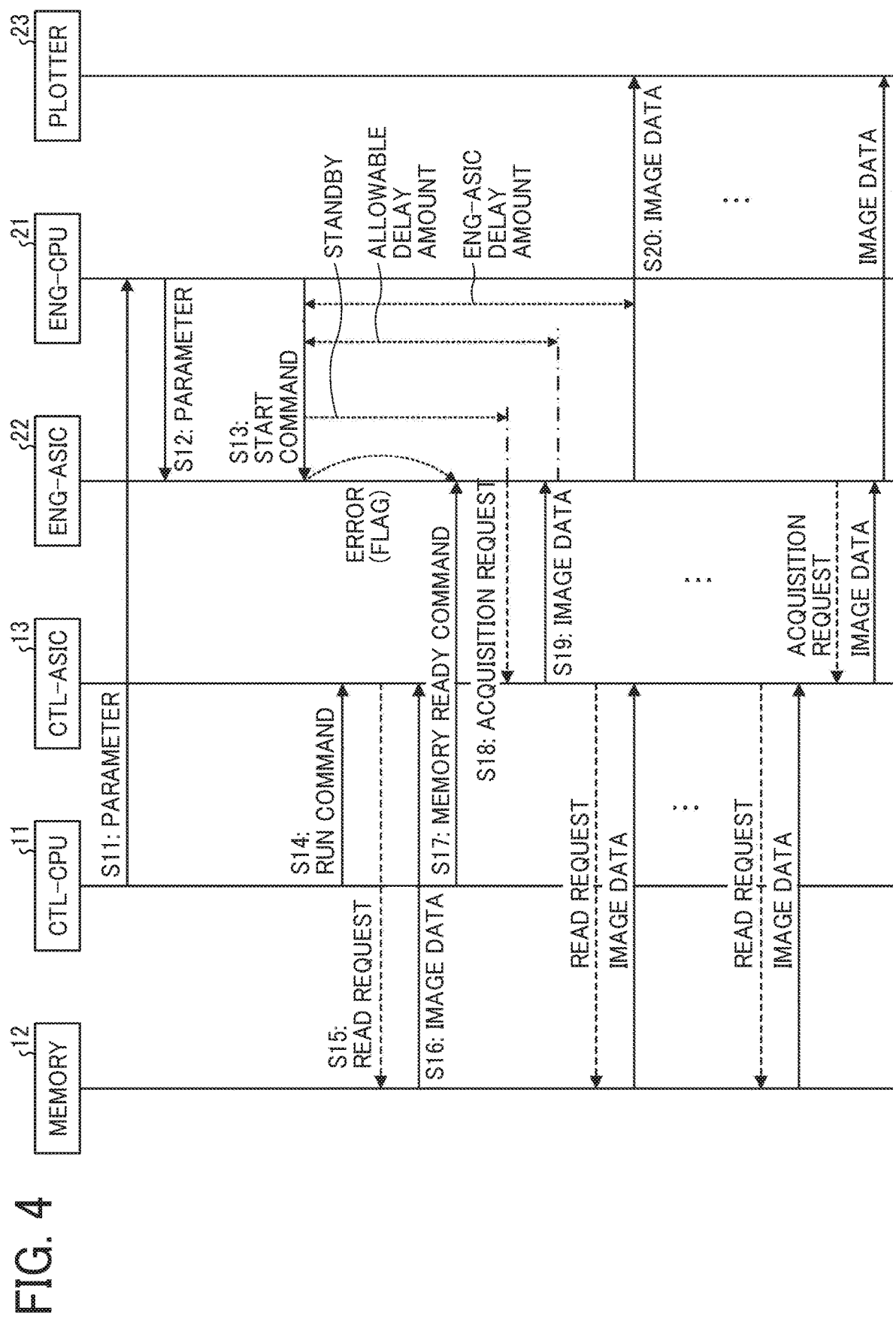
FIG. 4 is a sequence diagram illustrating a first example of a printing process in which the order is switched between activation of an application specific integrated circuit (ASIC) of a controller and activation of an ASIC of an engine.
Figure 5:
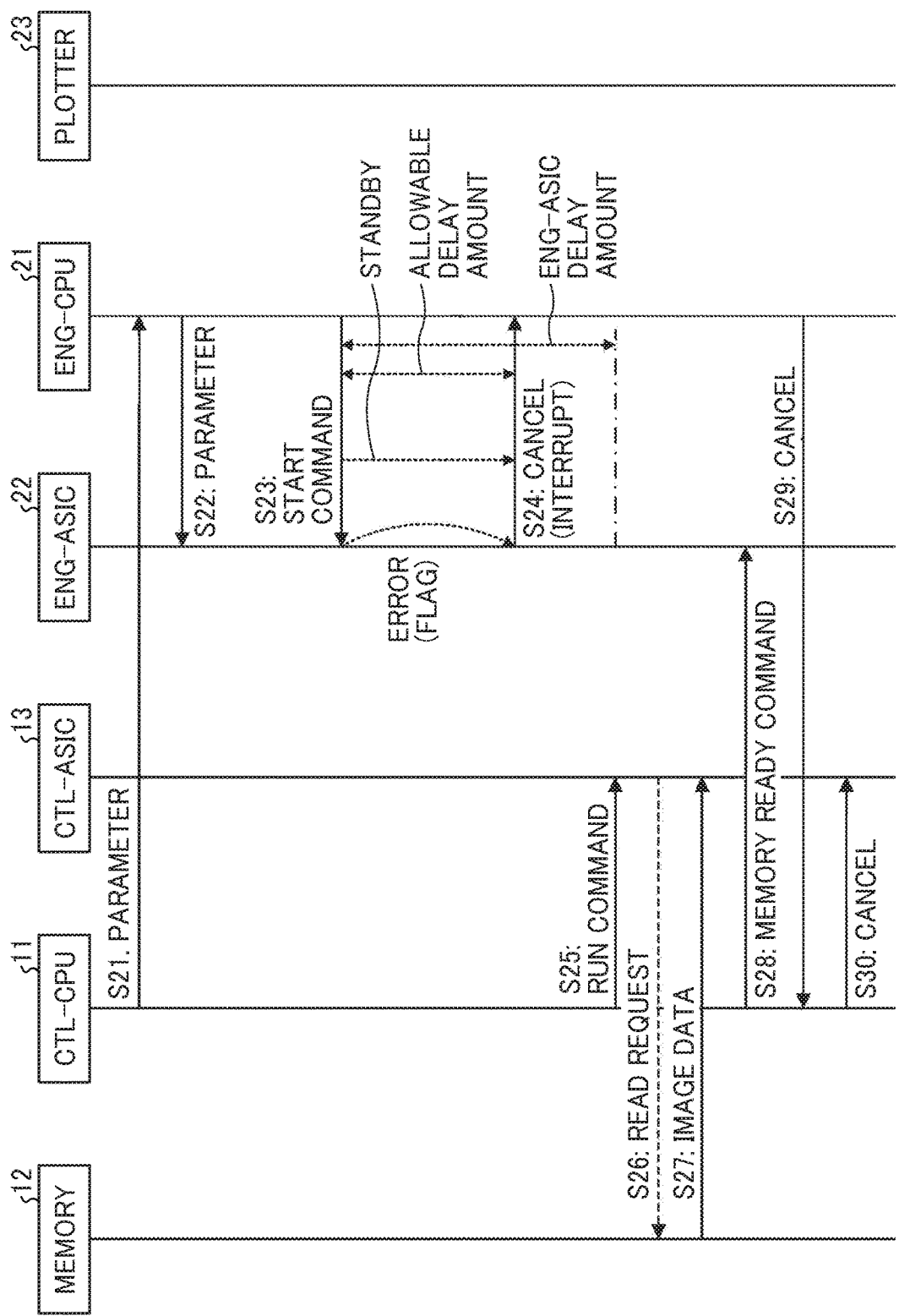
FIG. 5 is a sequence diagram illustrating a second example of the printing process in which the order is switched between the activation of the ASIC of the controller and the activation of the ASIC of the engine.

Referring now to FIGS. 4 and 5, a description is given of printing processes differing in sequence from the printing process illustrated in FIG. 3. Specifically, in the printing processes illustrated in FIGS. 4 and 5, the ENG-ASIC 22 is activated before the CTL-ASIC 13 is activated. More specifically, the ENG-ASIC 22 receives the start command from the ENG-CPU 21 before the Memory Ready command is written into the register 24 of the ENG-ASIC 22.

FIG. 4 is a sequence diagram illustrating a first example of the printing process in which the activation of the ENG-ASIC 22 precedes the activation of the CTL-ASIC 13.

Since steps S11 and S12 illustrated in FIG. 4 is substantially the same as the steps S1 and S2 illustrated in FIG. 3, a redundant description thereof is herein omitted.

In the present example, before the CTL-CPU 11 issues a run command, the ENG-CPU 21 issues a start command to the ENG-ASIC 22 in step S13.

The ENG-ASIC 22 refers to the register 24. Since a Memory Ready command is yet to be written into the register 24, the ENG-ASIC 22 sets an error flag and stores the error flag in the register 25.

Then, the CTL-CPU 11 issues the run command to the CTL-ASIC 13 in step S14.

The run command activates the CTL-ASIC 13.

In step S15, the CTL-ASIC 13 requests the image data from the memory 12.

In step S16, the CTL-ASIC 13 reads the image data from the memory 12.

The image data thus read is stored in the internal buffer of the CTL-ASIC 13.

After the image data is stored, the CTL-CPU 11 issues a Memory Ready command to the ENG-ASIC 22 via the CTL-ASIC 13 and writes the Ready command into the register 24 of the ENG-ASIC 22 in step S17.

The ENG-ASIC 22 measures the delay time from when the ENG-ASIC 22 receives the start command until when the Memory Ready command is written into the register 24, so as to determine whether the delay time is greater or less than the allowable delay amount that the ENG-ASIC 22 retains.

In the present example, the delay time is less than the allowable delay amount. Therefore, the ENG-ASIC 22 requests the image data from the CTL-ASIC 13 in step S18.

In step S19, the ENG-ASIC 22 acquires the image data from the internal buffer of the CTL-ASIC 13.

The CTL-ASIC 13 repeats requesting and reading image data from the memory 12.

Similarly, the ENG-ASIC 22 repeats requesting the image data from the CTL-ASIC 13 and acquiring the image data from the internal buffer of the CTL-ASIC 13.

These processes are repeated until the CTL-ASIC 13 reads all the image data from the memory 12.

In step S20, when the ENG-ASIC delay amount retained by the ENG-ASIC 22 elapses, the ENG-ASIC 22 transfers, to the plotter 23, the image data thus acquired, causing the plotter 23 to print out an image according to the image data.

This process is also repeated until the ENG-ASIC 22 transfers all the image data acquired.

FIG. 5 is a sequence diagram illustrating a second example of the printing process in which the activation of the ENG-ASIC 22 precedes the activation of the CTL-ASIC 13.

Since steps S21 to S23 illustrated in FIG. 5 is substantially the same as the steps S11 to S13 illustrated in FIG. 4, a redundant description thereof is herein omitted.

In the present example, the delay time is greater than the allowable delay amount.

In this case, in the engine 20, the ENG-ASIC 22 sets an error flag and stores the error flag in the register 25. Then, the ENG-ASIC 22 issues an interrupt to the ENG-CPU 21 to request cancellation of printing in step S24.

On the other hand, in the controller 10, the CTL-CPU 11 issues a run command to the CTL-ASIC 13 in step S25.

The run command activates the CTL-ASIC 13.

In step S26, the CTL-ASIC 13 requests the image data from the memory 12.

In step S27, the CTL-ASIC 13 reads the image data from the memory 12.

The image data thus read is stored in the internal buffer of the CTL-ASIC 13.

After the image data is stored, the CTL-CPU 11 issues a Memory Ready command to the ENG-ASIC 22 via the CTL-ASIC 13 and writes the Ready command into the register 24 of the ENG-ASIC 22 in step S28.

In response to the request from the ENG-ASIC 22, the ENG-CPU 21 requests the CTL-CPU 11 to cancel the printing, via the ENG-ASIC 22 and the CTL-ASIC 13 in step S29.

In step S30, the CTL-CPU 11 instructs the CTL-ASIC 13 to cancel the reading of the image data from the memory 12.

After the printing is canceled, the CTL-CPU 11 issues another run command to restart the printing sequence from the beginning.

Note that the allowable delay amount described above may be settable in the register 28 of the ENG-ASIC 22 from the ENG-CPU 21.

Such a configuration allows the ENG-CPU 21, which executes a program for controlling the engine 20, to set an adequate delay amount allowable in the controlling.

Alternatively, the ENG-ASIC 22 may automatically calculate the allowable delay amount and set the allowable delay amount thus calculated in the register 28.

Such a configuration reduces the workload of ENG-CPU 21.

Specifically, the ENG-ASIC 22 calculates the allowable delay amount by equation (1) below:

$$\text{allowable delay amount} = \text{ENG-ASIC delay amount} - \text{internal delay amount}, \quad (1)$$

where the ENG-ASIC delay amount, serving as a second delay time, is a register value settable from the ENG-CPU 21 and an internal delay amount, serving as a third delay time, is a value automatically determined according to an operating mode set for the ENG-ASIC 22.

Thus, the processing of the ENG-CPU 21 is reducible.

Figure 6:
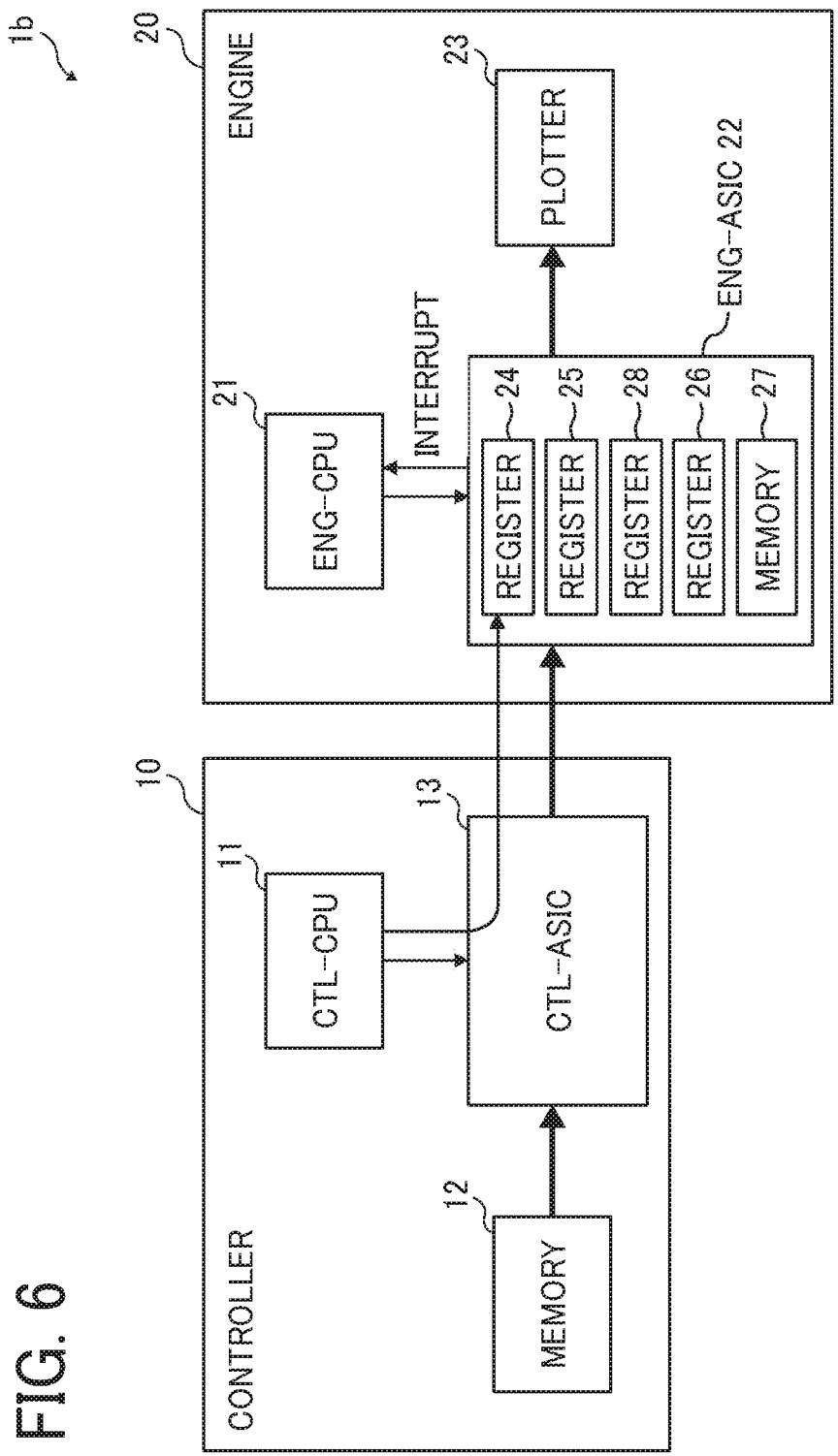
FIG. 6 is a diagram illustrating a second configuration of the image forming apparatus as an information output system according to an embodiment of the present disclosure.

Referring now to FIG. 6, a description is given of a second configuration of the image forming apparatus as an information output system according to an embodiment of the present disclosure.

FIG. 6 is a diagram illustrating a configuration of an image forming apparatus 1b, as the second configuration of the image forming apparatus as an information output system according to an embodiment of the present disclosure.

The image forming apparatus 1b illustrated in FIG. 6 includes a register 26 and a memory 27, in addition to the registers 24, 25, and 28.

Since the configuration of the controller 10 is substantially the same as the example illustrated in FIG. 2, a redundant description thereof is herein omitted.

Similarly, the configuration of the engine 20 is substantially the same as the example illustrated in FIG. 2 with respect to the ENG-CPU 21, the ENG-ASIC 22, the plotter 23, and the registers 24, 25, and 28. Therefore, a redundant description is herein omitted.

The register 26 is used to count the number of occurrences of an error that the activation order is changed.

Specifically, each time the error occurs, the ENG-ASIC 22 adds one to a counter value and stores the counter value, as an error counter value, in the register 26.

Information is readable from the register 26 by the ENG-CPU 21.

When the error occurs, the memory 27 stores, as an error log, a time stamp indicating the date and time at which the error occurs, the error counter value stored in the register 26, and the number of pages. Note that the error counter value and the number of pages are cumulative values.

Information is readable from the memory 27 by the ENG-CPU 21.

Since the information is readable from the register 26 and the memory 27, the ENG-CPU 21 is capable of reading the error log, which is used for debugging the program that the ENG-CPU 21 executes.

The ENG-ASIC 22 refers to the register 26.

When the error counter value stored in the register 26 exceeds a set reference value or given number, the ENG-ASIC 22 determines that a malfunction occurs and issues an interrupt.

The ENG-ASIC 22 includes a register in which a reference value is settable from the ENG-CPU 21.

Any value is settable as the reference value.

Accordingly, the ENG-CPU 21 recognizes the malfunction or abnormal number of error occurrences. The malfunction recognized is used for debugging the program that the ENG-CPU 21 executes.

In response to the interrupt issued by the ENG-ASIC 22, the ENG-CPU 21 requests the CTL-CPU 11 to cancel printing via the ENG-ASIC 22 and the CTL-ASIC 13.

In response to the request from the ENG-CPU 21, the CTL-CPU 11 instructs the CTL-ASIC 13 to cancel reading of image data.

When canceling the printing process as described above, the ENG-CPU 21 resets, at a given time, the error counter value and the number of pages stored as the error log in the memory 27.

As described above, even when the activation of the ENG-ASIC 22 precedes the activation of the CTL-ASIC 13, the ENG-ASIC 22 starts to acquire image data after the Memory Ready command is written or requests cancellation of data reading (i.e., cancellation of printing).

Accordingly, the embodiments of the present disclosure provide a reliable printing result.

A computer-readable recording medium storing program code according to the embodiments described above is providable. Alternatively, e.g., a server device may be providable that stores the program code and provides the program code upon a download request.

The output of information is not limited to printing. Alternatively, the output of information may be sound output or video output.

In such cases, the processes described above prevent an aberrant condition such as noise or image disturbance that may be caused when the activation of the ENG-ASIC 22 precedes the activation of the CTL-ASIC 13.

According to the embodiments of the present disclosure, the image forming apparatus does not cause an error in the information output.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Any one of the above-described operations may be performed in various other ways, for example, in an order different from that described above.

Any of the above-described devices or units can be implemented as a hardware apparatus, such as a special-purpose circuit or device, or as a hardware/software combination, such as a processor executing a software program.

Further, each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read only memories (ROMs), etc.

Alternatively, any one of the above-described and other methods of the present disclosure may be implemented by the ASIC, prepared by interconnecting an appropriate network of conventional component circuits or by a combination thereof with one or more conventional general-purpose microprocessors and/or signal processors programmed accordingly.

What is claimed is:

1. An information output system comprising:
a main memory configured to store information;
a first processing circuit configured to read the information from the main memory;
a second processing circuit configured to receive the information read from the first processing circuit and to transfer the information read;
an output device configured to receive, from the second processing circuit, the information read and to output the information transferred; and
notifying circuitry configured to notify the second processing circuit of an activation timing via an ASIC of the first processing circuit,
the second processing circuit being configured to start to transfer the information read from the first processing circuit to the output device after being notified of the activation timing of the first processing circuit or, when a start command received at the second processing circuit is received before a start command is received at the first processing circuit, request the first processing circuit to cancel reading of the information, according to a time by which the activation timing notified from the first processing circuit is delayed from an activation timing of the second processing circuit.

2. The information output system according to claim 1, further comprising a first memory in the second processing circuit configured to store a first delay time allowable as the time by which the activation timing notified is delayed from the activation timing of the second processing circuit,
wherein, based on the first delay time, the second processing circuit is configured to determine whether to start to transfer the information to the output device after being notified of the activation timing of the first processing circuit or whether to request the first processing circuit to cancel the reading of the information.

3. The information output system according to claim 2,
wherein the second processing circuit is configured to calculate the first delay time with a second delay time and a third delay time stored in the second processing circuit,
wherein the second delay time is set as a time from activation of the second processing circuit until when the second processing circuit starts to transfer the information to the output device, and
wherein the third delay time is determined according to an operating mode set for the second processing circuit.

4. The information output system according to claim 1, wherein the second processing circuit is configured to detect an activation timing error in response to the activation timing notified being delayed from the activation timing of the second processing circuit.

5. The information output system according to claim 4, further comprising a second memory in the second processing circuit configured to store information indicating occurrence of the activation timing error in response to the second processing circuit detecting the activation timing error.

6. The information output system according to claim 4, further comprising control circuitry configured to activate the second processing circuit,
wherein, the second processing circuit is configured to notify the control circuitry of the activation timing error detected.

7. The information output system according to claim 6, further comprising a third memory in the second processing circuit configured to store a log in response to the second processing circuit detecting the activation timing error,
wherein the log includes:
date and time at which the second processing circuit detects the activation timing error;
a number of occurrences of the activation timing error added in response to the second processing circuit detecting the activation timing error; and
a number of pages of the information output.

8. The information output system according to claim 7, wherein the second processing circuit is configured to notify the control circuitry of occurrence of the activation timing error in response to the number of occurrences of the activation timing error exceeding a given number.

9. The information output system according to claim 1, further comprising:
a first module, including:
the main memory;
the first processing circuit; and
the notifying circuitry; and
a second module, including:
the second processing circuit; and
the output device.

10. An information output method comprising:
storing information in a main memory of an information output system;
reading the information from the main memory;
transferring the information read;
outputting the information transferred; and
notifying a second processing circuit of the information output system of an activation timing of a first processing circuit of the information output system,
starting the transferring after the notifying or, when a start command received at the second processing circuit is received before a start command is received at the first processing circuit, requesting the first processing circuit to cancel the reading, according to a time by which the activation timing notified is delayed from an activation timing of the second processing circuit.

\* \* \* \* \*